April 22, 1924.
J. HUDSON
1,491,750
AIR CIRCULATING SYSTEM FOR CARGO VESSELS
Filed July 17, 1923  2 Sheets-Sheet 1
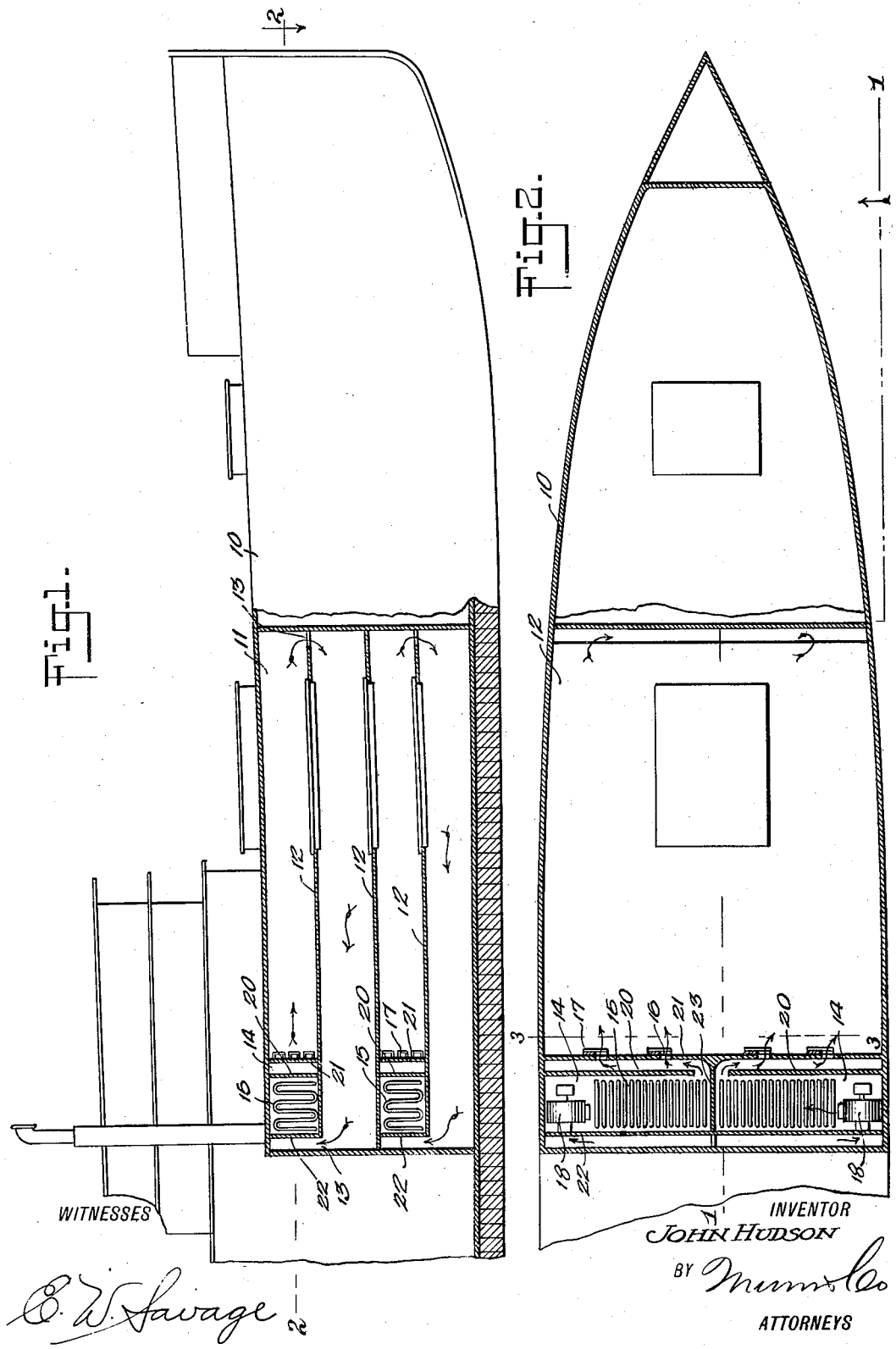

April 22, 1924.
J. HUDSON
AIR CIRCULATING SYSTEM FOR CARGO VESSELS
Filed July 17, 1923  2 Sheets-Sheet 2
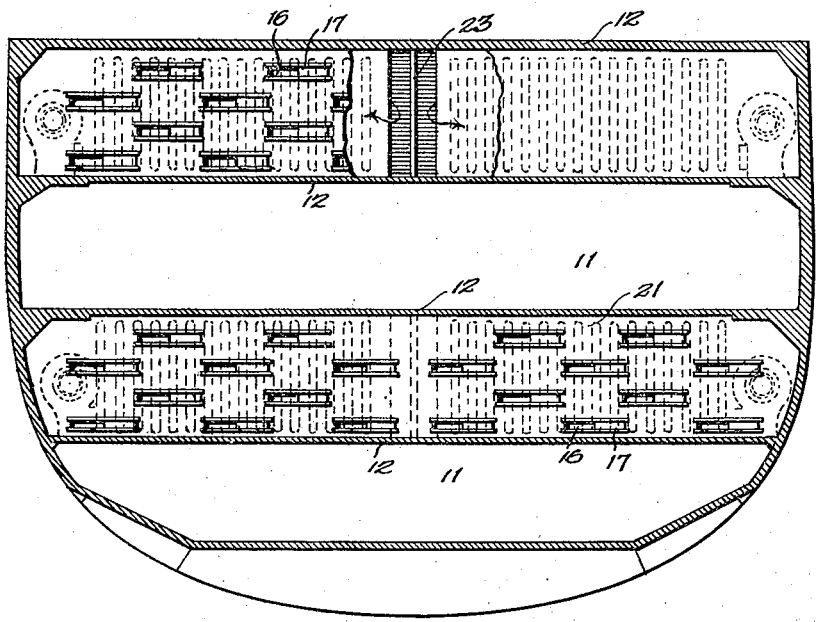
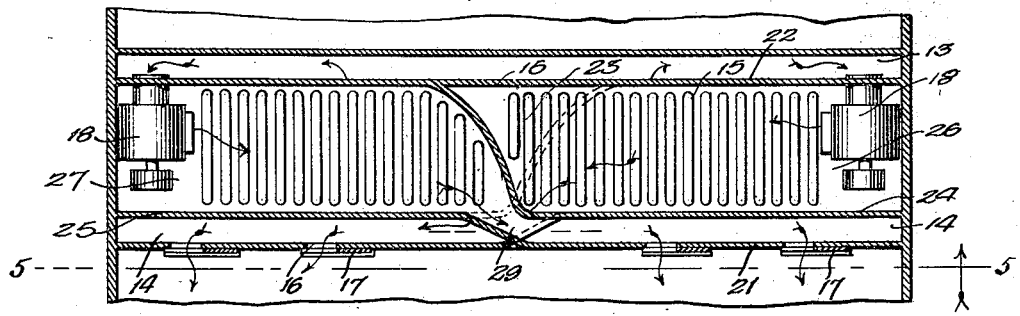
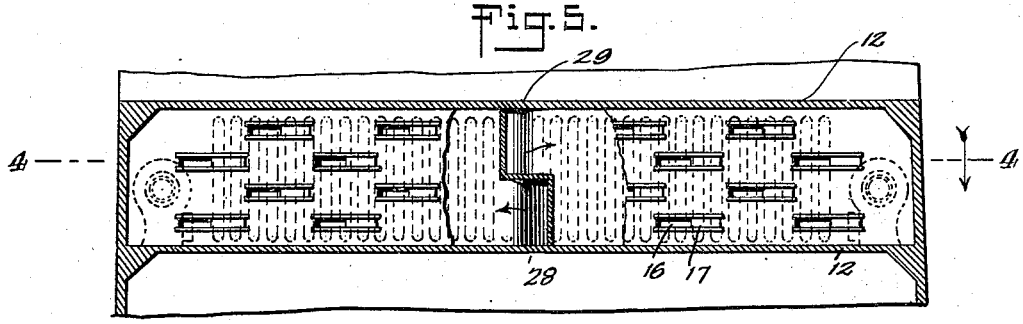
WITNESSES
INVENTOR
JOHN HUDSON
BY
ATTORNEYS Patented Apr. 22, 1924.

1,491,750

UNITED STATES PATENT OFFICE.

JOHN HUDSON, OF BROOKLYN, NEW YORK.

AIR-CIRCULATING SYSTEM FOR CARGO VESSELS.

Application filed July 17, 1923. Serial No. 652,159.

*To all whom it may concern:*

Be it known that I, JOHN HUDSON, a citizen of the United States, and a resident of the city of New York, borough of Brooklyn, in the county of Kings and State of New York, have invented new and useful Improvements in Air-Circulating Systems for Cargo Vessels, of which the following is a full, clear, and exact description.

This invention relates to air circulating systems for vessels and was primarily designed for use in cargo vessels.

In the ordinary cargo vessel provided with an air circulating system for supplying air to the cargo or for controlling the temperature of the cargo compartment much space is taken up by the air trunks. This cuts down the carrying capacity of the cargo vessel, increasing the cost of carrying freight. In some vessels the air trunks or passageways surround the whole vessel, greatly cutting down its carrying capacity.

The general object of this invention is the provision of an inexpensive and efficient circulating system for cargo ships, simple in construction and occupying only a comparatively small space.

This object is accomplished by forming in each end of alternate decks of a cargo vessel, which is divided into a plurality of cargo compartments by a plurality of decks, openings establishing communication between the cargo compartments above and below the alternate decks thus utilizing the decks for directing the circulation of air and providing in the cargo compartments means for circulating and controlling the temperature of the air.

This and other objects of the invention will be more clearly understood from the following detailed description and accompanying drawings.

Figure 1 is a vertical longitudinal section through a portion of a cargo vessel, showing the construction of the air circulating system;

Figure 2 is a horizontal section along the line 2—2, Figure 1, showing the air circulating system;

Figure 3 is a vertical cross section along the line 3—3, Figure 2;

Figure 4 is a horizontal section along the line 4—4, Figure 5, showing the construction of a modified form for circulating and controlling the temperature of the air;

Figure 5 is a vertical cross section along the line 5—5, Figure 4, with a portion of the front wall broken away showing the construction of a modified form of the air circulating device.

Referring to the above-mentioned drawings, the invention includes a cargo vessel 10, the body of which is divided into a number of cargo compartments 11 by the decks 12 extending horizontally in the body of the vessel. Formed in each end of alternate decks 12 are openings 13 establishing communication between the storage rooms above and below said alternate decks. Erected on the alternate decks 12 are two vertical walls 21 and 22 extending transversely across the deck and upward to the next deck above. Extending between the vertical walls is a vertical wall 23 forming two compartments 14. These compartments 14 are preferably located at one end of the decks 12.

A plurality of openings 16 are provided in the vertical wall 21. Sliding doors 17 are mounted on the wall 21 for closing the openings 16. Mounted in each compartment 14 are coils 15 for controlling the temperature of the air driven through the compartments 14. A blower 18 is located in each compartment 14 and communicates, through the wall 22, with the storage space provided below the deck on which the coils are mounted. In order to compel the air circulated by the blowers 18 to travel over all the coils 15 baffle walls 20 are erected in the compartments 14 back of the openings 16. These baffle walls extend from the outer walls of the ship inward toward the vertical wall 23.

In the operation of this circulating system air is drawn from the cargo compartments below the alternate decks and forced over the coils 15 by the blowers 18. After the temperature of the air has been raised or lowered, as desired, by the coils 15 it is forced around the baffle walls 20 and distributed into the cargo compartments 11 above the alternate decks 12. The air then moves through the cargo compartments above the alternate decks and thence through the openings 13 downward to the cargo compartments below the alternate decks. The doors 17 may be adjusted to control the amount of air that flows through the openings 16.

A modification of the device is shown in Figures 4 and 5. In this modification the construction is the same with the exception of the front walls defining the compartments 14. As shown in Figure 4, instead of baffles 20, vertical walls 24 and 25 are erected forming compartments 26 and 27, respectively, in the larger compartments 14 provided by erecting the wall 21. As shown in Figure 4, the compartment 26 communicates with the space between the walls 25 and 21 on the left-hand side through a passageway 28 while the compartment 27 communicates with the space between the walls 24 and 21 through a passageway 29. The air circulated by the blower 18 in the compartment 26 is delivered into the cargo compartments 11 through the openings provided in the left-hand end of the wall 21, as viewed in Figure 4, while the air circulated by the blower 18 in the compartment 27 is delivered into the cargo compartment 11 through the openings provided in the right-hand end of the wall 21.

I would state in conclusion that while the illustrated examples constitute practical embodiments of my invention I do not limit myself strictly to the exact details herein illustrated since manifestly the same can be considerably varied without departing from the spirit of the invention as defined in the appended claims.

Claims.

1. In a cargo vessel, a plurality of decks providing a plurality of cargo compartments, alternate decks having openings formed therein establishing communication between the cargo compartments adjacent said alternate decks, compartments provided in the cargo compartments, means mounted in said compartments for circulating air, means mounted in said compartments for controlling the temperature of the air as it circulates, means for distributing air from the compartments, and means for controlling said distributing means.

2. In a cargo vessel, a plurality of decks providing a plurality of cargo compartments, certain of said decks having openings formed at each end establishing communication between adjacent cargo compartments, spaced walls at one end of certain of said cargo compartments extending transversely between adjacent decks, another wall extending transversely to the first-named walls for forming compartments, the latter compartments having communication with the adjacent cargo compartment through one of said walls, means in each of the second-named compartments for controlling the temperature of air passed through said compartments, and a blower in each of said second-named compartments having communication with a next adjacent cargo compartment through one of said walls and one of the openings in the deck separating two adjacent cargo compartments.

3. In a cargo vessel, a plurality of decks providing a plurality of cargo compartments, certain of said decks having openings formed at each end establishing communication between adjacent cargo compartments, spaced walls at one end of certain of said cargo compartments extending transversely between adjacent decks, another wall extending transversely to the first-named walls for forming compartments, the latter compartments having communication with the adjacent cargo compartment through one of said walls, means in each of the second-named compartments for controlling the temperature of air passed through said compartments, a blower in each of said second-named compartments having communication with a next adjacent cargo compartment through one of said walls and one of the openings in the deck separating two adjacent cargo compartments, and a baffle wall in each of said second-named compartments terminating short of the wall extending transversely of the first two named walls.

JOHN HUDSON.